United States Patent
Gopalakrishnan et al.

(10) Patent No.: US 8,386,684 B2
(45) Date of Patent: Feb. 26, 2013

(54) DATA PROCESSING SYSTEM AND METHOD OF INTERRUPT HANDLING

(75) Inventors: Ranjith Gopalakrishnan, Bangalore (IN); Milind Manohar Kulkarni, Bangalore (IN)

(73) Assignee: NXP B.V., Eindhoven (NL)

( * ) Notice: Subject to any disclaimer, the term of this patent is extended or adjusted under 35 U.S.C. 154(b) by 8 days.

(21) Appl. No.: 12/747,523

(22) PCT Filed: Dec. 8, 2008

(86) PCT No.: PCT/IB2008/055146
§ 371 (c)(1),
(2), (4) Date: Dec. 7, 2010

(87) PCT Pub. No.: WO2009/074946
PCT Pub. Date: Jun. 18, 2009

(65) Prior Publication Data
US 2011/0106995 A1    May 5, 2011

(30) Foreign Application Priority Data
Dec. 12, 2007    (EP) .................................... 07122966

(51) Int. Cl.
*G06F 13/32*    (2006.01)
*G06F 1/00*    (2006.01)
(52) U.S. Cl. ........ 710/269; 710/260; 710/267; 713/323; 713/324
(58) Field of Classification Search ........... 710/260–267
See application file for complete search history.

(56) References Cited

U.S. PATENT DOCUMENTS 4,418,385 A    11/1983    Bourrez
5,918,057 A *   6/1999    Chou et al. .................... 710/260
(Continued)

FOREIGN PATENT DOCUMENTS

EP    0 459 714 A2    12/1991
WO    2007/077539 A1    7/2007

OTHER PUBLICATIONS

Small, C., et al. "A Revisitation of Kernel Synchronization Schemes," Proc. of the Usenix Conference, pp. 31-41 (1997).

(Continued)

*Primary Examiner* — Brian Misiura
(74) *Attorney, Agent, or Firm* — Kramer & Amado P.C.

(57) ABSTRACT

A data processing system is provided which comprises at least two processing units (100, 101, 102) each for executing a plurality of tasks and an interrupt handling unit (200) for receiving an interrupt to be processed by the data processing system and for distributing the interrupt to one of the at least two processing units (100, 101, 102). The processing unit (100, 101, 102) to which the interrupt is distributed stops its current execution of the task and processes the interrupt. The interrupt handling unit (200) is adapted to determine whether the processing units (100, 101, 102) are executing a critical section (CS) of the task. The interrupt handling unit (200) distributes the interrupt to one of the processing units (100, 101, 102), which is not executing a critical section (CS) of a task.

12 Claims, 1 Drawing Sheet

U.S. PATENT DOCUMENTS

| | | | | |
|---|---|---|---|---|
| 6,237,058 B1 * | 5/2001 | Nakagawa | | 710/260 |
| 6,799,236 B1 * | 9/2004 | Dice et al. | | 710/200 |
| 6,877,057 B2 | 4/2005 | Alexander et al. | | |
| 7,191,349 B2 * | 3/2007 | Kaushik et al. | | 713/323 |
| 7,328,294 B2 * | 2/2008 | Kim et al. | | 710/260 |
| 7,590,982 B1 * | 9/2009 | Weissman | | 718/1 |
| 7,899,966 B2 * | 3/2011 | Kulkarni | | 710/267 |
| 7,917,910 B2 * | 3/2011 | Cavallo | | 718/108 |
| 7,953,906 B2 * | 5/2011 | Zytaruk et al. | | 710/48 |
| 2002/0152374 A1 * | 10/2002 | Mayfield | | 713/153 |
| 2002/0166018 A1 | 11/2002 | Kim | | |
| 2003/0105798 A1 | 6/2003 | Kim et al. | | |
| 2003/0200250 A1 | 10/2003 | Kiick | | |
| 2011/0072180 A1 * | 3/2011 | Lee | | 710/260 |

OTHER PUBLICATIONS

International Search Report and Written Opinion for Int'l. Patent Appln. No. PCT/IB2008/055146 (Dec. 8, 2008).

Giroir D. et al, "Interrupt Dispatching Method for Multiprocessing System", IBM Technical Disclosure Bulletin, International Business Machines Corp. (Thornwood), US, vol. 27, No. 4B, Jan. 1, 1984, pp. 2356-2359, XP002232995, ISSN: 0018:8689.

* cited by examiner

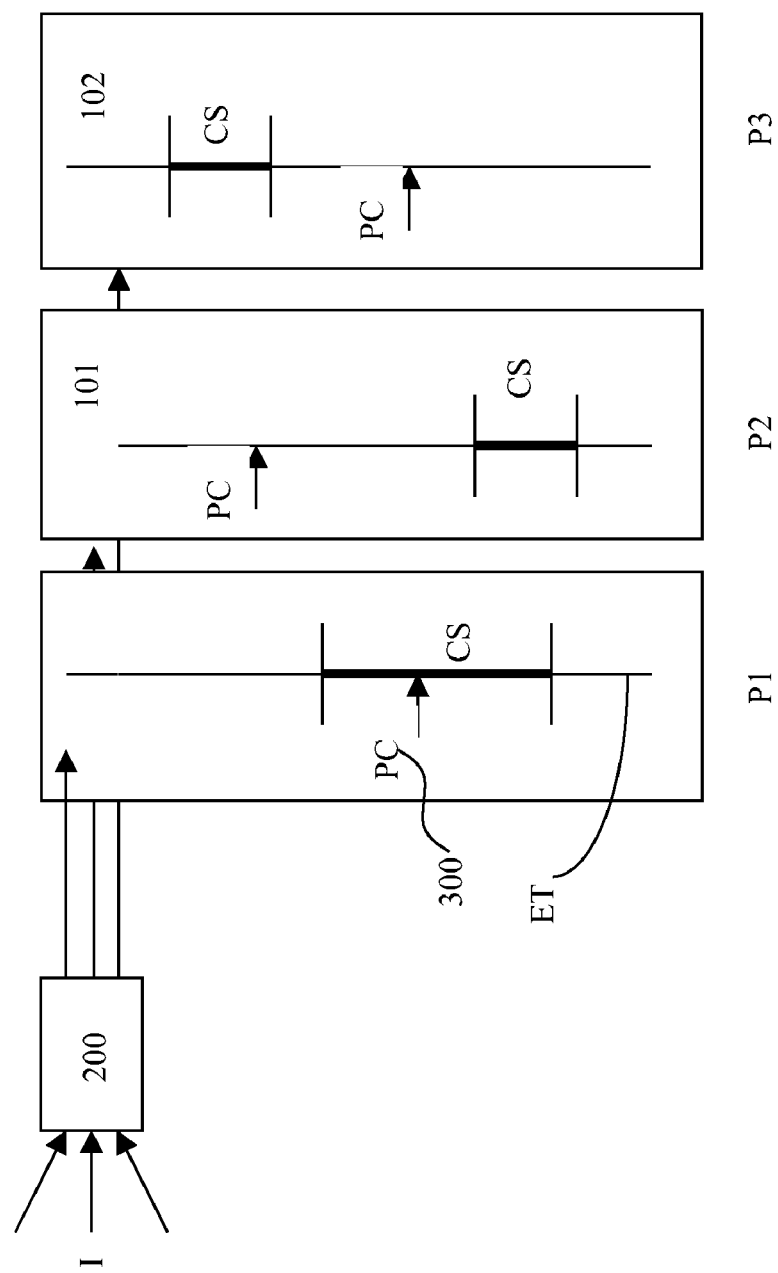

DATA PROCESSING SYSTEM AND METHOD OF INTERRUPT HANDLING

FIELD OF THE INVENTION

The present invention relates to a data processing system and a method of interrupt handling.

BACKGROUND OF THE INVENTION

In data processing systems, which comprise a plurality of processors or processing units, i.e. in multi-processor systems, each processor or processing unit can be adapted to process or execute a task. These tasks may also include tasks, which need to be processed in real-time as these tasks have strict deadlines associated to their processing. In such data processing systems, interrupts may occur which have to be processed by one of the processors. To be able to process the interrupt, the currently processed task is stopped or interrupted. For example, if the processor is performing some real-time tasks and if this processing is interrupted, the processing of the real-time tasks may not meet the real-time requirements. This could lead to an increase in the scheduling latency, which should be avoided in some multimedia applications.

In particular, if a plurality of processors is present in a data processing system, typically not all of the processors will be performing real-time tasks such that the interrupts may be handled by a further processor.

US 2003/0105798 A1 relates to an interrupt distribution scheme based on interrupt characteristics such as the priority of a device or an interface, the priority of a thread or an application which are running on different processors.

US 2002/0166018 relates to a dynamic routing and priority assignment of an interrupt. The interrupt controller is dynamically controlled by programming at least one register.

U.S. Pat. No. 6,877,057 B2 teaches a scheme of a uniform distribution of interrupts across units on a processor circuit board and devices on any extension slots.

US 2003/0200250 A1 concerns a dynamic reassignment of interrupt service routines ISR to processors based on the run-time statistics like the execution times of the interrupt service routines.

However, in the interrupt distribution according to the prior art, no information with respect to the tasks is included which is awaiting processor times and information with respect to the state of the execution of a process on a processor during the interrupt handling and distribution.

SUMMARY OF THE INVENTION

It is an object of the present invention to provide a data processing system and a method of interrupt handling with an improved and more efficient interrupt handling capability.

This object is solved by a data processing system according to claim 1 and by a method according to claim 5.

Therefore, a data processing system is provided which comprises at least two processing units each for executing a plurality of tasks and an interrupt handling unit for receiving an interrupt to be processed by the data processing system and for distributing the interrupt to one of the at least two processing units. The processing unit to which the interrupt is distributed stops its current execution of the task and processes the interrupt. The interrupt handling unit is adapted to determine whether the processing units are executing a critical section of the task. The interrupt handling unit distributes the interrupt to one of the processing units, which is not executing a critical section of a task.

According to an aspect of the invention, the interrupt handling unit determines whether a task is waiting to be processed by the processing unit, which is currently executing a critical section of a task. The interrupt is distributed to the processing unit, which does not have a task waiting to be processed after the current task.

According to a further aspect of the invention, the interrupt handling unit determines the remaining execution time of the execution of the critical section of a task. The interrupt is then distributed to the processing unit with a small remaining execution time.

According to still a further aspect of the invention, a plurality of flags is provided which are each being associated to one of the processing units for indicating whether the processing unit is executing a critical section of a task. The interrupt handling unit is adapted to monitor the plurality of flags to determine to which processing unit the interrupt is to be distributed to.

The invention also relates to a method of interrupt handling in a data processing system. The data processing system comprises at least two processing units each for executing a plurality of tasks and an interrupt handling unit for receiving an interrupt to be processed and for distributing the interrupt to one of the at least two processing units. The processing unit to which the interrupt is distributed stops the current execution and processes the interrupt. The interrupt handling unit determines whether the processing units are executing critical sections of the tasks. The interrupt handling unit distributes the interrupt to one of the processing units, which is not executing a critical section of the task.

The invention relates to the idea to provide a data processing system with a plurality of processing units and an interrupt handling unit for handling and distributing interrupts in the data processing system. The interrupts will be distributed to one of the processing units, which is not executing a critical section of a task. If all of the processors are executing a critical section of a task, optionally then one of these processors can be selected to which no task awaiting its execution after the currently executed task is associated. If all of the processing units are executing a critical section of a task and have tasks waiting or pending, then optionally that processor can be selected which is executing a critical section but for which the remaining execution time in this critical section is small. Therefore, if an interrupt is present in the data processing system, the interrupt handling unit can check whether any processor is not executing a critical section of a task. If at least one processor is present in this system not executing a critical section of the task, this processor can be selected and the interrupt can be assigned to this processor. However, if all processors are executing critical sections of the tasks, then the interrupt handling unit can check whether tasks are waiting on the end of an execution in the critical section. In other words, it is determined whether a processor is present for which no tasks are waiting. If this condition is not fulfilled by any of the processing units, then that processor is determined which merely has a small time of execution left in the critical section.

With the data processing system according to the invention, the performance of real-time task can be improved and the probability of real-time tasks missing deadlines can be reduced.

Further aspects of the invention are described in the dependent claims.

BRIEF DESCRIPTION OF THE DRAWINGS

Advantages and embodiments of the invention will now be described in more detail with reference to the drawings.

FIG. 1 shows a schematic block diagram of a data processing system according to the first embodiment.

DETAILED DESCRIPTION OF EMBODIMENTS

FIG. 1 shows a schematic block diagram of a data processing system according to the first embodiment. The data processing system comprises for example three processing units 100, 101, 102 and an interrupt handling unit 200. It should be noted that the data processing system might also comprise more than three processing units as well as more than a single interrupt handling unit. The interrupt handling unit 200 receives interrupts I and is coupled to each of the processing units 100, 101, 102 for distributing the received interrupt I to one of the processing units 100, 101, 102. Each of the processing units 100, 101, 102 will process or execute a task P1, P2, P3, respectively. Each processing unit 100-102 can comprise a program counter PC 300 which may also be used to store the address of the current instruction being processed or executed by the processing unit 100-102. An execution trace ET indicates the proceeding of the program counter PC being executed by the processing unit 100, 101, 102. In each of the codes being executed by the processing units 100-102, a critical section CS may be present. The execution of this critical section CS is critical for the task to be executed within its requirements, which may be real-time requirements. Therefore, care should be taken to ensure that the execution of the code of the critical sections CS is not interrupted.

Here, as an illustrative example, the first processing unit 100 is currently operating in the critical section CS, the second processing unit 101 has not reached the critical section CS of its code while the third processing unit has already performed the execution of the critical section CS.

If the first processing unit 100 is executing a first task T1 and the execution of the first task has already entered the critical section CS, a second task T2 may be waiting to be processed by the first processing unit. Optionally, the second task T2 may also have a higher priority than the first task T1. Previously, the second task T2 will not be able to pre-empt the processing of the first task T1 unless the execution of the first task T1 has left the critical section CS.

If, however, an interrupt occurs in the data processing system and if this interrupt is assigned to the first processing unit 100, the interrupt processing cannot start until the first processing unit 100 has not executed the critical section of the first task T1. The interrupt processing may start at the end of execution of the critical section of the first task T1, however, this may result in the delay of the processing of higher priority task T2. If the first task or even if the second task T1, T2 relates to an execution of a real-time task, the deadlines for their execution can be missed.

On the other hand, the second and third processing units 101, 102 are currently not executing a critical section CS of a task. Therefore, any interrupt could be distributed to the second or third processing unit 101, 102 without any negative effects on their processings.

Accordingly, the interrupt handling unit 200 can dynamically assign an interrupt to one of the processing units 100, 101, 102 which is not currently executing a critical section CS of a task. If each processing unit is executing a critical section CS of a task, then that processor is selected for handling the interrupt which has no task (possibly with a high priority) waiting for the execution of the critical section CS such that it may be processed. Furthermore or alternatively, that processing unit which is executing a critical section of a task but those expected time of execution is small is selected.

Additionally, the interrupt handling unit 200 may also consider the previous and/or statistical interrupt service routine execution time of each of the processing units. Furthermore, the priority of the interrupting device may be considered. Moreover, the priority of the running thread and the priority of the processor in the system can be considered. The effect of the interrupt which could be a context switch, a cache flashing etc. can be considered. The ideal time of the processing units may also be considered.

If a processor enters an execution of a critical section, the processor may flag this fact. More flags may be set for other states like high priority task awaiting a processor. The interrupt handling unit 200 may be able to monitor the flags of each processor and may use the flags for deciding where to allocate the interrupt.

The above-mentioned processing units can be implemented as identical processors or processing units such that a symmetric multi processor system is achieved.

According to the invention, an interrupt handling mechanism is described which does not only involve the prioritizing of the interrupt but also the distribution of the interrupts to one of the appropriate processors. The distribution of the interrupts among the available processors can be based on the determination that one of the processors is not executing in a critical section of a task, that the processor is executing a critical section of a task but no tasks are waiting for the processors to exit from the critical section and that the processor is executing in a critical section while the expected time of execution is rather small. In these cases, an interrupt may be assigned to that processing unit.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

Furthermore, any reference signs in the claims shall not be constrained as limiting the scope of the claims.

The invention claimed is:
1. A data processing system, comprising:
at least two processing units, each of the processing units configured to execute a plurality of tasks; and
an interrupt handling unit configured to receive an interrupt, distribute the received interrupt to one of the at least two processing units, wherein the processing unit to which the interrupt is distributed stops execution of a current task and processes the interrupt, wherein the interrupt handling unit is configured to determine whether the processing unit is executing a non-critical section or a critical section of the current task, and distribute the received interrupt to one of the processing units which is executing the non-critical section of the current task based upon a previous interrupt service routine execution time of each of the processing units.
2. The data processing system according to claim 1, wherein the interrupt handling unit is configured to determine whether another task is waiting to be processed by the processing unit which is executing the critical section of the current task and distribute the interrupt to the processing unit which does not have a task waiting to be processed after the current task.

3. The data processing system according to claim 1, wherein a flag is respectively associated with each processing unit for indicating whether the respective processing unit is executing the critical section of the current task, and the interrupt handling unit is configured to monitor the respective flag to determine to which processing unit the interrupt is to be distributed to.

4. A data processing system, comprising:
at least two processing units, each of the processing units configured to execute a plurality of tasks, stop execution of a current task after receipt of an interrupt, and process the interrupt; and
an interrupt handling unit configured to receive an interrupt, distribute the received interrupt to one of the at least two processing units, determine whether the processing units are executing a non-critical section or a critical section of the current task, determine a remaining execution time of execution of the critical section of the current task, and distribute the received interrupt to a processing unit with a small remaining execution time based upon a statistical interrupt service routine execution time of each of the processing units.

5. A method of interrupt handling in a data processing system having at least two processing units, each processing unit configured to execute a plurality of tasks, and an interrupt handling unit configured to receive an interrupt to be processed by the data processing system and distribute the received interrupt to one of the at least two processing units, the method comprising:
stopping execution of a current task;
processing the received interrupt;
determining whether the processing units are executing a non-critical section or a critical section of the current task; and
distributing the processed interrupt to the one of the processing units which is executing the non-critical section of the current task, based upon a previous interrupt service routine execution time of each of the processing units.

6. The method of claim 5, further comprising:
distributing the processed interrupt based upon a priority of a running thread.

7. The method of claim 5, further comprising:
distributing the processed interrupt based upon a priority of the processing unit.

8. The method of claim 5, further comprising:
distributing the processed interrupt based upon the interrupt being a context switch.

9. The method of claim 5, further comprising:
distributing the processed interrupt based upon the interrupt being cache flashing.

10. The method of claim 5, further comprising:
distributing the processed interrupt based upon an ideal time of the processing unit.

11. The method of claim 5, further comprising:
setting a flag to designate a high priority task awaiting a processing unit.

12. A method of interrupt handling in a data processing system having at least two processing units, each processing unit configured to execute a plurality of tasks, and an interrupt handling unit configured to receive an interrupt to be processed by the data processing system and distribute the received interrupt to one of the at least two processing units, the method comprising:
stopping execution of a current task;
processing the received interrupt;
determining whether the processing units are executing a non-critical section or a critical section of the current task; and
distributing the processed interrupt to the one of the processing units which is executing the non-critical section of the current task, based upon a statistical interrupt service routine execution time of each of the processing units.

* * * * *